July 22, 1924.
L. G. DE KERMOR
METHOD OF REGULATION OF HEAT GENERATED BY ELECTRICITY
Filed Dec. 2, 1921
1,502,294
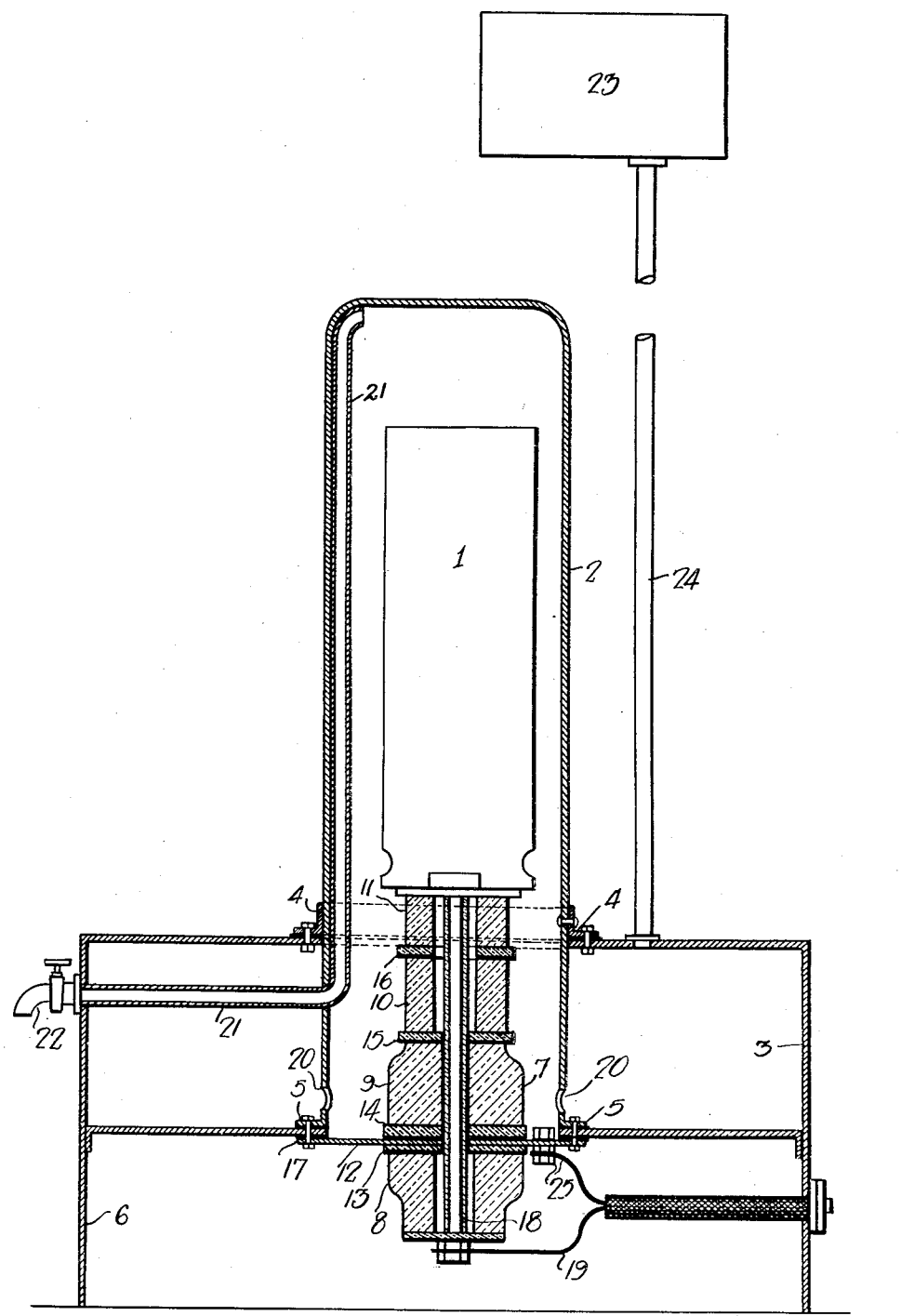
INVENTOR
Louis G. de Kermor
Per Caron Lavon
Attorney Patented July 22, 1924.

1,502,294

UNITED STATES PATENT OFFICE.

LOUIS G. DE KERMOR, OF EDMONTON, ALBERTA, CANADA, ASSIGNOR TO DE KERMOR ELECTRIC HEATING COMPANY LIMITED, OF EDMONTON, PROVINCE OF ALBERTA, CANADA.

METHOD OF REGULATION OF HEAT GENERATED BY ELECTRICITY.

Application filed December 2, 1921. Serial No. 519,425.

*To all whom it may concern:*

Be it known that I, LOUIS G. DE KERMOR, a subject of the King of Great Britain, residing at Edmonton, in the Province of Alberta and Dominion of Canada, have invented a certain new and useful Method of Regulation of Heat Generated by Electricity, of which the following is a specification.

My invention relates to improvements in electrical heat generators wherein the heat derived from a current passing through an electrode or a block of electrodes, immersed in a liquid acting as a resistance, is proportionate to the area of the immersed surface of the said electrode or electrodes.

The object being to permit the construction of self-regulating water heaters or steam generators requiring no mechanical contrivance whatever.

The state of the art reveals that it is possible to utilize the liquid into which an electrode is immersed as a regulator for the amount of heat desired, by causing the liquid to be displaced along the electrode by the heat generated which, in the form of vapor, acts to displace the electrode immersing liquid an amount proportionate to the pressure of the vapor on the liquid at the required heat. To accomplish this I dispose the electrode in a column of liquid capable of being overbalanced by the pressure of the vapor at the heat required so as to accurately vary the length of contact of the column of liquid on the electrode according to the amount of heat utilized.

In the accompanying drawings wherein a practical application of my method is illustrated, 1 is the electrode which may be formed of one element or comprised of blocks of electrodes. (In larger apparatus the three-wire system may be used). 2 is the casing enclosing the electrodes. This casing is closed at the top, the bottom being surrounded by a liquid reservoir 3 preferably removably connected thereto as at 4 and 5. The sides of this reservoir may extend past the bottom thereof as shown at 6 to form a standard supporting the apparatus. The electrode 1 is preferably mounted on an insulating base 7 composed of superposed porcelain sections having coinciding central perforations. A plate 12 is held by the lower sections 8 and 9 between gaskets 13 and 14. Sections 9, 10 and 11 also rest on gaskets 15 and 16 as shown. Plate 12 is connected to the bottom of casing 2 over gasket 17 by bolts 5. Electrode 1 is connected to a source of current, not shown, by wire 19 extending therefrom and connected to a rod 18 passing through the base 7, said rod serving also to unite the sections of the base. A second leading wire is grounded to the apparatus at 25. Communication between the casing 2 and reservoir 3 is obtained by perforations 20 around the base of casing 2. A pipe 21 extending up to the top of casing 2 serves as a vent to remove the air from the casing. This pipe is provided with a valve 22 mounted on the outer end. An expansion tank provided with a well known overflow pipe and a float feed not shown is connected to reservoir 3 by pipe 24.

The mode of operating the apparatus is as follows: Valve 22 of vent pipe 21 is opened. Reservoir 3 is filled with water from tank 23, this filling being continued until the water rises in casing 2 and comes out through valve 22 when the same may be closed. The electric current is then turned on. The heat generated by the resistance of the water to the passing of the current therethrough will produce vapor which will accumulate at the top of casing 2 and gradually displace the water column thereby gradually diminishing the active area of the electrode. When the column of water arrives at a point where its weight equals the pressure of the vapor generated it will remain there until the temperature decreases, causing the lowering of the vapor pressure. The water column will then rise and increase the heating surface of the electrode which will increase the pressure of the vapor when this pressure will again lower the column of water and decrease the heating surface.

By the description above given it will be evident that I have contrived a self-regulating electric heater independent of any mechanical contrivance, accurate in action and practically fool-proof. This method may be utilized either as a hot water heater or a steam generator for heating of domestic water, dwellings or for the generation of steam or hot water for any general purposes.

The drawings accompanying illustrate the application of my method. The details thereof may be varied in practice according to the application and it must be understood that many changes both in the form and the disposition of the different parts may be made without departing from the spirit of the invention as covered by the following claims.

Claims:

1. In an electrical heater of the type described, a casing closed at the top, a second casing enclosing the first casing positioned at the lower end thereof, means to establish communication between said casings, means to completely fill the said casings, means to take up the expansion displacement in said casings, means to completely remove the air at the top of the first casing, and means to insulatingly support an electrode in said first casing.

2. In an electrical heater of the class described, a casing closed at the top, an electrode, insulatingly mounted, passing through the bottom thereof, a supplementary casing connected to said first casing positioned at the bottom thereof, means to completely fill the said casing comprising an expansion tank positioned above the level of the top of the first casing, and means to completely remove the air from the top of the first casing comprising a pipe mounted inside and extending up and close to the top thereof, and a valve at the outer end of said pipe.

L. G. DE KERMOR.

In the presence of—
M. GRIMES,
M. BLACK.